G. A. JORDAN.
BRANCH BLOCK FOR ELECTRIC MOLDINGS OR CONDUITS.
APPLICATION FILED APR. 28, 1910.
1,022,423.
Patented Apr. 9, 1912.
2 SHEETS—SHEET 2.
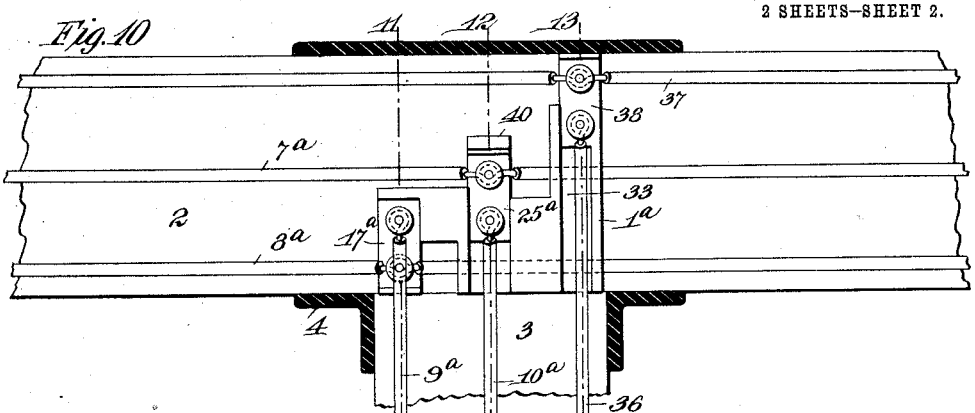
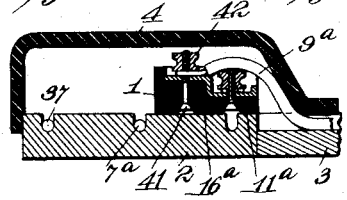
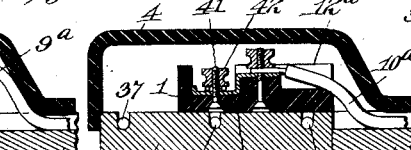
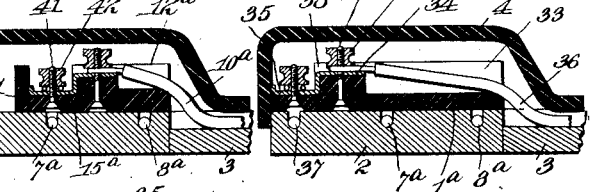
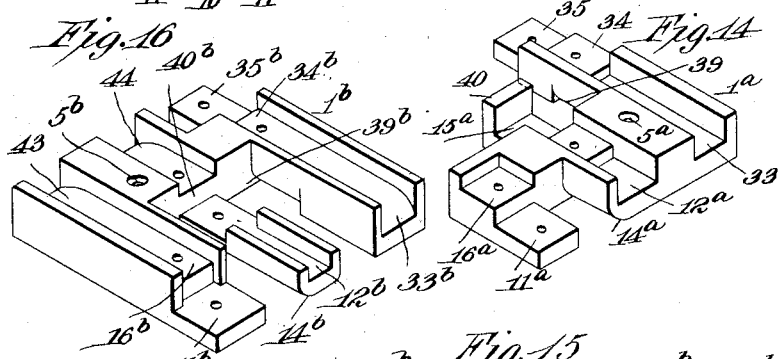
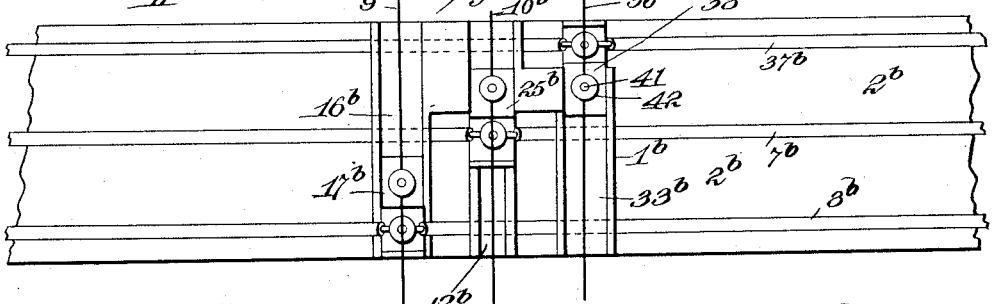
Witnesses:
Jas. F. Coleman
John L. Lotsch
Inventor
George A. Jordan
By Alger, Alger & Taylor
Attorneys.
COLUMBIA PLANOGRAPH CO., WASHINGTON, D. C.

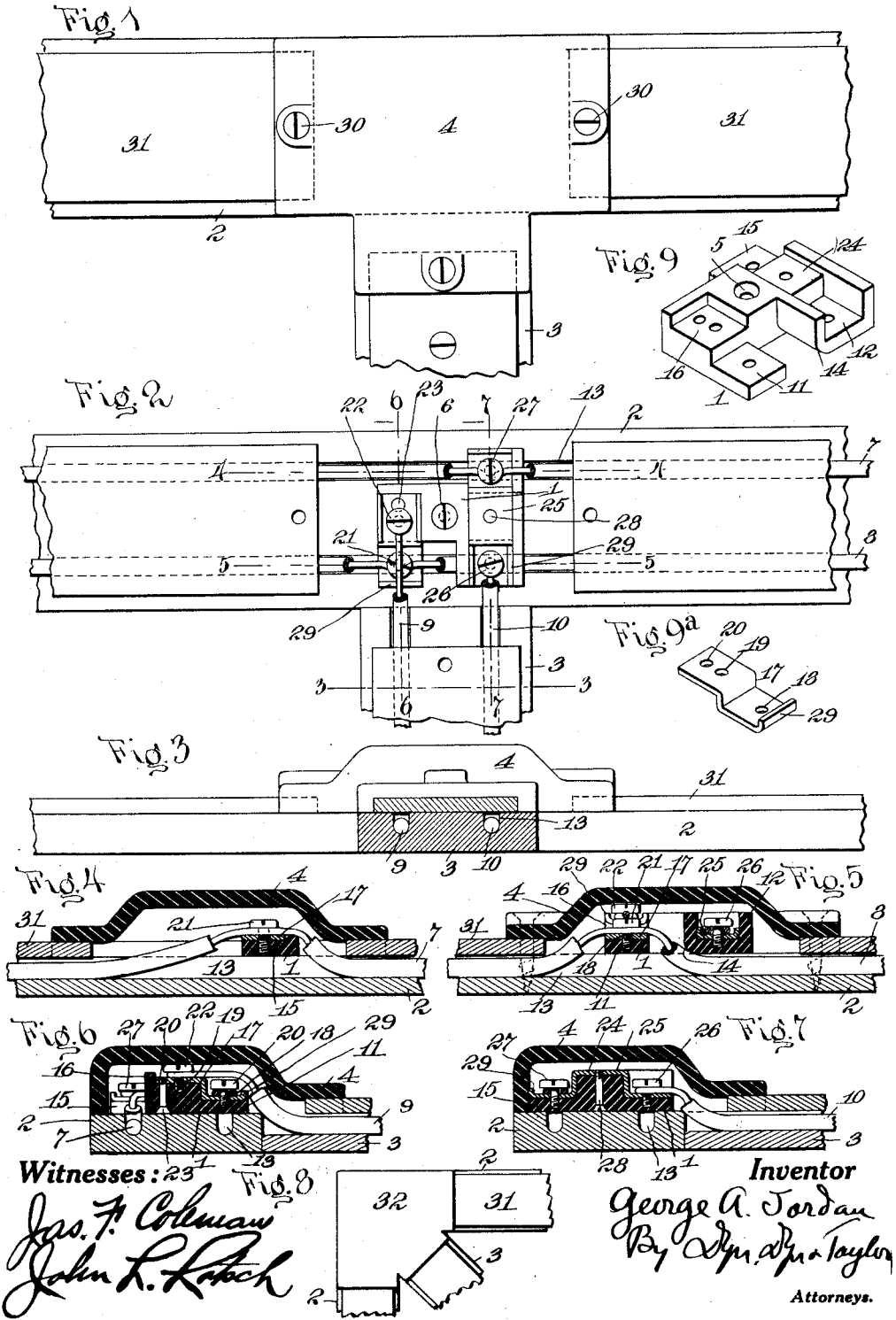

UNITED STATES PATENT OFFICE.

GEORGE A. JORDAN, OF NEW YORK, N. Y.

BRANCH BLOCK FOR ELECTRIC MOLDINGS OR CONDUITS.

1,022,423.   Specification of Letters Patent.   Patented Apr. 9, 1912.

Application filed April 28, 1910. Serial No. 558,131.

*To all whom it may concern:*

Be it known that I, GEORGE A. JORDAN, a citizen of the United States, and a resident of Brooklyn, county of Kings, city and State of New York, have invented certain new and useful Improvements in Branch Blocks for Electric Moldings or Conduits.

The object I have in view is the production of a branch block for a molding or conduit which may be used without danger of short-circuiting, which may be applied without cutting the mains, and may be used without necessity of covering the joints with tape, may be fitted in place without alteration of the molding, and which will be cheap and effective and easily applied.

My invention may be utilized on straight molding or in corners and with a molding for three wire work. These and further objects will appear from consideration of the embodiment of my invention set forth in the following specification and accompanying drawings, considered together or separately.

In the drawings: Figure 1 is a plan view of a molding and branch, showing a cover in place over the branch block base. Fig. 2 is a view of the same with the cover removed, showing the branch block base in place. Fig. 3 is a section taken on the line 3—3 of Fig. 2. Fig. 4 is a section taken on the line 4—4 of Fig. 2. Fig. 5 is a section taken on the line 5—5 of Fig. 2. Fig. 6 is a section taken on the line 6—6 of Fig. 2. Fig. 7 is a section taken on the line 7—7 of Fig. 2. Fig. 8 is a view of a modified form of branch block for use in a corner, showing a modified form of cover. Fig. 9 is a perspective view of a branch block base. Fig. 9ª is a perspective view of a metal or conducting clip for use in connection with the branch block. Fig. 10 is a view of a modified form of branch block base for three wires. Fig. 11 is a section on the line 11—11 of Fig. 10. Fig. 12 is a section on the line 12—12 of Fig. 10. Fig. 13 is a section on the line 13—13 of Fig. 10. Fig. 14 is a perspective view of the branch block base shown in Figs. 10-13 inclusive. Fig. 15 is a modified form of branch block base for three wires; and Fig. 16 is a perspective view of the branch block base shown in Fig. 15.

In all of the views, like parts are designated by the same reference characters.

In the drawings, 1 is the branch block base, 2 the main molding, 3 the branch molding, 4 the branch block cover. The branch block base 1 is made of insulating material, preferably of porcelain, molded to shape. It is provided with an opening 5 for the passage of a screw 6, or other suitable fastening, by means of which it is attached to the molding. The branch block base is so formed that it will have portions passing over and portions passing under the mains, and will have means for attachment to the branches, and for making electrical connection with the mains.

In Fig. 2, the mains are indicated by the characters 7, 8, and the branches by the characters 9, 10. The principles of the invention are best understood by a description of the specific embodiment illustrated. In the embodiment illustrated, the branch block base is of generally rectangular shape, having a projecting portion or a shelf 11, over which the main 8 passes. It has a projecting bridge or trough 12, under which the main 8 passes. It will be understood that the molding is of the usual type with grooves 13, for the entrance of the mains and branches. The bottom of the bridge or trough 12 is on the same plane as the bottom of the base, but the edge 14 is rounded, as shown in Figs. 9 and 5. The insulation on the main 8 is removed adjacent to the shelf 11, as shown, to make electrical connection at that point. On the other side of the base is a shelf 15, over which passes the main 7. The insulation of the main at this point is removed as shown in Fig. 2, for making electrical connection. A seat 16 is formed in the base above and in line with the shelf 11. A metal clip 17, shown in perspective in Fig. 9ª, rests upon the seat 16 and also upon the shelf 11. This clip has three openings 18, 19 and 20. Through the opening 18 a screw 21 passes. The main 8 is passed around the screw 21 under the head and is clamped tightly against the clip, making electrical connection. Through the opening 19 a screw 22 passes, see Fig. 2, and this screw is used as a binding post for making connection with the branch 9. Through the opening 20 a screw 23 passes, see Fig. 6, and this screw serves to hold the clip in place upon the base.

The connection between the main 7 and the branch 10 is made as follows: On the side of the base opposite from the seat 16 is a seat 24. This seat is the same width as, and is in line with, the bridge or trough 12 and shelf 15. A metal clip 25, see Fig. 7, rests upon the seat 24 and its ends lie within the bridge or trough 12 and upon the shelf 15. This metal clip is provided with three openings, one for the passage of the screw 26 for attachment to the main 10, another for the passage of the screw 27 for attachment to the main 7, and one for the passage of the screw 28, which extends up through the base and into the clip, holding the latter in place. The depth of the seat 24 is to be such that the clip 25 will not extend above the level of the base. If desired, the clips may be provided with upturned edges 29, see Figs. 2, 5 and 9ª, for preventing the wire from slipping off, thus increasing the insulation.

The mode of connection of the block with the mains and branches is as follows: The branches and mains being within the grooves in the moldings, the insulation is removed from the ends of the branches and from the proper portions of the mains. The base is then introduced in place, the main 8 having its uninsulated portion passing over the shelf 11 and its insulated portion under the bridge or trough 12. The main 7 has its uninsulated portion passing over the shelf 15. The clips 17 and 25 having previously been secured in place by their screws 23 and 28, the main 7 is secured to the clip 25 by means of the screw 27, so as to make electrical connection with the clip, and the main 8 is secured to the clip 17 by means of the screw 21, making electrical connection with the clip. The end of the branch 9 is then secured to the screw 22, making electrical connection with the clip 17 and with the main 8. The end of the branch 10 is connected by the screw 26 to the clip 25, thereby making electrical connection with the main 7. The base is held firmly in place by means of the screw 6. The cover 4 may then be introduced in place and secured in position by means of the screws 30. This cover is substantially the same width as the molding and extends over and rests upon the capping or covers 31, 31 of the molding.

The device may be used in connection with a corner molding, (see Fig. 8) a cover 32 of appropriate shape being employed. My invention may also be employed in connection with the three wire system. The branch block base is then made differently from that described in connection with the two wire mains. Fig. 14 shows in perspective view one form of appropriate branch block base for the wires. It will be apparent that this base is similar to the block shown in Fig. 9, but slightly modified, the corresponding portions being indicated by similar characters, with the exponent $a$ added. There is an additional bridge or trough 33, an additional seat 34 and an additional shelf 35 for the third branch for connection with the third main. The third branch is indicated by 36, and the third main by 37. A clip 38 rests upon the table 34 and upon the shelf 35, and is held in place by screws, as shown. A groove 39 is formed under the table 34 to allow the middle main to lie in place. The shelf 15ª is provided with a flange 40, which extends upward, thus offering an insulating screen between the mains 7ª and 37. The connections in this base are made as described in the preceding one. In this modification of block, instead of screws similar to those shown in the other views being employed, I utilize bolts 41 having thumb nuts 42 for making connection with the mains and branches.

Figs. 15 and 16 show a modification of the invention, in which a different form of base is used, having a more generally rectangular shape and possessing greater strength than the base shown in Fig. 14, and by means of which the branches 9ᵇ, 10ᵇ and 36ᵇ may be led in either or both directions, the mains 8ᵇ, 7ᵇ and 37ᵇ, being connected to the branches as shown in Fig. 15. The base in Fig. 16 is similar to the base in Fig. 14, except for the necessary changes, due to the fact that the branches lead in both directions. Parts shown in Fig. 16, corresponding to those in Fig. 14, are indicated by similar numerals with the exponent $b$. The seat and bridge portion 16ᵇ is extended, and curved down at 43 to allow the branch 9ᵇ to extend off properly. The seat and bridge portion 44, curved down as shown, will allow the branch 10ᵇ to extend off properly and prevent its coming in contact with the mains 7ᵇ and 37ᵇ. In lieu of the flange 40, in Fig. 14, a wall 40ᵇ is provided offering an insulating screen between the mains 7ᵇ and 37ᵇ. The projecting bridge or trough 12ᵇ is separated, at its sides, from the shelf 11ᵇ on one side, and the bridge or trough 33ᵇ on the other, so that the branch 10ᵇ may be bent upward and passed over the bridge or trough 12ᵇ for engagement with the clip 25ᵇ and out of possible contact with the main 8ᵇ. The main 7ᵇ may be passed under the bridge or trough 16ᵇ, over, and attached to the clip 25ᵇ and under the bridge or trough 33ᵇ.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now described my invention, what

I claim as new and desire to secure by Letters Patent, is:—

1. A branch block base having a shelf portion for each main over which said mains pass, bridge portions over the mains over which portions the branches pass, and connections between the proper mains and branches located on the shelf and bridge portions.

2. A branch block base having a projecting trough, a seat and a shelf in line with the trough, a clip connecting the seat and the shelf, a connection for the branch on the seat, the said branch lying within the trough, and the said trough lying above the main.

3. A branch block base having a shelf at one side, a seat upon a higher level and a clip connecting the shelf and seat, a connection for a main above the shelf, a connection for a branch above the seat, the base having at the other side a projecting trough under which the main passes, there being a seat and a shelf in line with the trough, the seat being on a higher plane than the shelf, a clip lying upon the seat and shelf, a second main passing over the second shelf and a second branch passing through the trough and connecting with the second main.

4. A branch block comprising a base adapted to be secured to a molding and having a shelf portion for each main over which said mains pass, bridge portions over the mains over which portions the branches pass, and connections between the proper mains and branches located on the shelf and bridge portions; and a cover adapted to cover said base and overlap the ends of the molding capping adjacent said base.

5. In combination, a grooved molding; a branch block base mounted thereon above the grooves; capping on said molding covering the grooves and terminating adjacent said base; and a branch block cover, substantially the same width as said molding, covering said base and covering the end portions of the capping adjacent said base.

6. In combination, a grooved molding; a branch block base mounted thereon above the groove; a capping on said molding covering the groove and terminating adjacent to said base, the said capping being narrower than the molding; and a branch block cover substantially the same width as, and resting upon, the molding, covering said base and covering the end portions of the capping adjacent to the base; and means for securing the said cover to the capping and molding.

7. In combination, a grooved molding; a branch block mounted thereon above the groove; a capping on said molding covering the groove and terminating adjacent to the base, said capping being narrower than the molding; and a branch block cover substantially the same width as the molding, said cover covering the base and the end portions of the capping adjacent to the base, and having flanges resting on the molding and inclosing the sides of the block and the sides of the capping adjacent to the base.

This specification signed and witnessed this 22nd day of April, 1910.

GEORGE A. JORDAN.

Witnesses:
LEONARD H. DYER,
JOHN L. LOTSCH.